United States Patent
Patil et al.

(10) Patent No.: US 12,327,006 B2
(45) Date of Patent: Jun. 10, 2025

(54) REPEAT SECTION IN CHECKLIST BUILDER AND METHOD OF USING

(71) Applicant: RAKUTEN SYMPHONY, INC., Tokyo (JP)

(72) Inventors: Shivam Patil, Madhya Pradesh (IN); Ankit Tiwary, Madhya Pradesh (IN); Shahajad Hussain, Madhya Pradesh (IN)

(73) Assignee: RAKUTEN SYMPHONY, INC., Tokyo (JP)

(*) Notice: Subject to any disclaimer, the term of this patent is extended or adjusted under 35 U.S.C. 154(b) by 0 days.

(21) Appl. No.: 17/756,818

(22) PCT Filed: Apr. 20, 2022

(86) PCT No.: PCT/US2022/025500
§ 371 (c)(1),
(2) Date: Jun. 2, 2022

(87) PCT Pub. No.: WO2023/204801
PCT Pub. Date: Oct. 26, 2023

(65) Prior Publication Data
US 2024/0160334 A1  May 16, 2024

(51) Int. Cl.
*G06F 3/0482* (2013.01)

(52) U.S. Cl.
CPC .................... *G06F 3/0482* (2013.01)

(58) Field of Classification Search
CPC ............ G06F 3/0482; G06Q 10/06311; G06Q 10/20; G06Q 10/06316; G06Q 50/40
See application file for complete search history.

(56) References Cited

U.S. PATENT DOCUMENTS

2015/0370776 A1* 12/2015 New ..................... G06F 3/0482
  715/234
2020/0126017 A1* 4/2020 Damonte .................. G06F 8/20

* cited by examiner

*Primary Examiner* — Andrey Belousov
(74) *Attorney, Agent, or Firm* — HAUPTMAN HAM, LLP

(57) ABSTRACT

An apparatus includes a processor and a memory to cause the apparatus to output a GUI on a display. The GUI includes a checklist configuration view to display a condition menu, the condition menu includes a group of variables from which a user is able to select to configure a condition to be applied to a workflow, wherein the group of variables comprising a type of condition, the type of condition being on/off, a value for the type of condition, and a location to which the type of condition will be applied to, the value is mapped to a data input. The GUI includes a checklist execution view to display the workflow, which includes a group designation, a parameter, and a fillable data field. The condition is applied to the workflow in response to the data input, which is mapped to the value, being entered into the fillable data field.

18 Claims, 9 Drawing Sheets

Site Checklist — 502

1.1 Group 1 — 504
506
Is Battery Installed
● Yes — 508
○ No — 510

2.1 Battery Information — 512

2.2 Battery Information — 514

Save as Draft  Save

Cancel

REPEAT SECTION IN CHECKLIST BUILDER AND METHOD OF USING

RELATED APPLICATIONS

The present application is a National Phase of International Application No. PCT/US2022/025500, filed Apr. 20, 2022.

FIELD

The present disclosure relates generally to the field of telecommunications, specifically to a system including a repeat section in a checklist builder and a method of using.

BACKGROUND

A checklist provides a systematic approach to follow a procedure or protocol for completion of a task. In some approaches, a checklist includes a question or series of questions related to the task to be completed, and the question reminds the user of the checklist to complete a process in the task before moving on to a next process of the checklist, and so on. For example, in repairing an antenna in a telecommunication network, a technician follows a checklist during the repair.

A task is a scenario associated with an output of a function within a protocol, and are used to determine a user's satisfactory experience with the protocol. The task is created by a programmer of the protocol, and a user has very little to no input in creating the task for the user's own preferences.

When tasks are applied to a checklist-type protocol, a user of the checklist is limited to the confines of the task created by the programmer.

SUMMARY

An aspect of this description relates to an apparatus for creating a checklist. The apparatus includes a processor. The apparatus further includes a memory having non-transitory instructions stored thereon that. The processor is configured to execute the instructions to cause a graphic user interface ("GUI") to be output by a display. The GUI includes a checklist configuration view to display a condition menu, the condition menu comprising a group of variables from which a user is able to select to configure a condition to be applied to a workflow, wherein the group of variables are interdependent comprising: (i) a type of condition, (ii) whether the type of condition is selected to be on/off, (iii) a value for the type of condition selected, and (iv) a location/object to which the type of condition selected will be applied to/acted upon, and the value is mapped to a data input. The GUI further includes a checklist execution view to display the workflow, the workflow comprising a group designation having a task, a parameter, and a data field to receive the data input, wherein the condition is applied to the workflow in response to the data input, which is mapped to the value, being entered into the data field.

An aspect of this description relates to a method. The method includes storing instructions on a memory. The method further includes executing, using a processor to execute the instructions, to cause a graphic user interface ("GUI") to display an output. The output includes a checklist creation view for selecting a parameter, wherein the parameter is linked to a task. The task is linked to a group designation. The checklist creation view further includes an edit feature adjacent to the parameter. The method further includes selecting the edit feature to obtain a configuration menu to configure a condition. The method further includes assigning the condition to the parameter. The output further includes a checklist execution view of the group designation, the task, and the parameter, wherein, based on the selected parameter. The method further includes applying the condition to the group designation or not applying the condition to the group designation. The condition is repeating of the group designation or not repeating of the group designation.

An aspect of this description relates to a non-transitory computer readable medium storing instructions thereon, wherein the instructions are executable by a processor to cause the processor to cause a graphic user interface ("GUI") to be output by a display. The GUI includes a checklist creation view to select a parameter, wherein the parameter is linked to a task. The task is linked to a group designation. The checklist creation view further includes an edit feature adjacent to the parameter. The edit feature, when selected, includes a configuration menu to configure a condition. The condition being assignable to the parameter. The GUI further includes a checklist execution view of the group designation, the task, and the parameter, wherein, based on the selected parameter, the condition is applied to the group designation or the condition is not applied to the group designation, and the condition is repetition of the group designation or no repetition of the group designation.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a view of a GUI of a configuration menu for a condition in accordance with some embodiments.

FIG. 4 is a view of a GUI of a configuration menu to evaluate a condition that is applied in accordance with some embodiments.

FIG. 5 is a view of a GUI of a configuration menu to evaluate a condition that is not applied in accordance with some embodiments.

DETAILED DESCRIPTION

Figure 1:
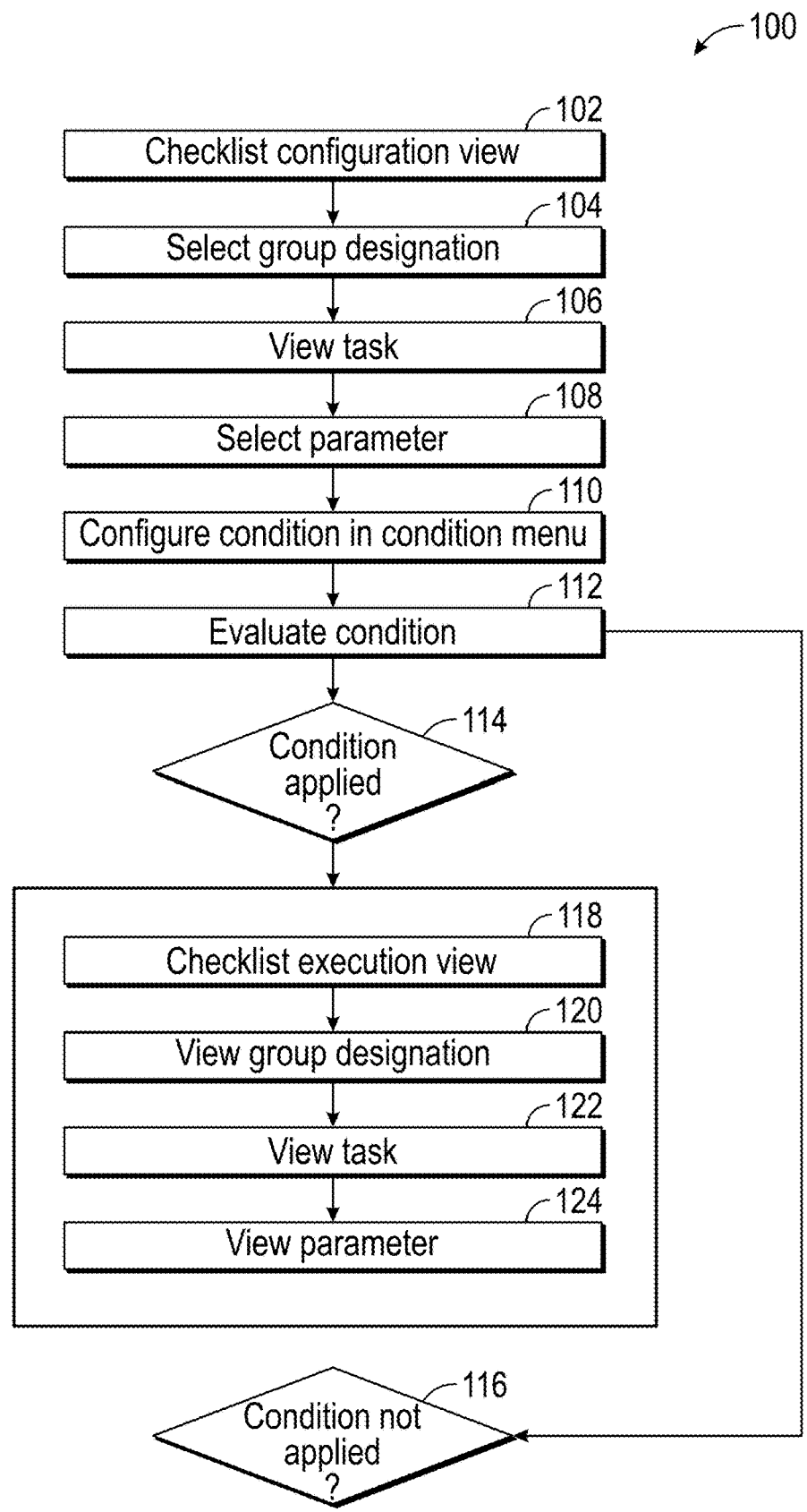
FIG. 1 is a flow chart of configuring a condition for a parameter of a test case in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In telecommunication systems, as well as other multiple component systems, equipment, such as antennas, are often damaged or go inactive for one reason or another, e.g., due to being placed outside exposed to weather and the elements. When equipment is damaged repairs are performed, and a technician will visit the site, assess the situation, and make a repair. In assessing the situation, a technician will follow a checklist or protocol. The checklist is able to be viewed on a display of a device accessible by the technician, such as a hand held device, to systematically address and determine the problem with the damaged equipment, and make the repair or replacement of the equipment. Oftentimes, multiple pieces of equipment of the same type are damaged and also in condition to be repaired. In other approaches, checklists are static, and not able to be adapted for a situation a technician finds once on site, or in the field. A checklist with the functionality to adapt for different use cases would assist with improving usefulness for an end user, such as a technician. In doing so, an end user would be able to have access to a task of the checklist protocol, and the end user would be able to apply a condition(s) to the task, which would streamline the workflow by the end user and reduce time in repetitively accessing a checklist protocol.

The current description is a system and method of using the system to adapt or customize a checklist protocol by applying a condition to a task within the checklist protocol.

FIG. 1 is a flow chart of a method 100 of configuring a condition, evaluating a condition, and executing a condition for a task in accordance with some embodiments. The method 100 is usable to allow a user to identify a section of a checklist protocol to have the condition applied to the section by configuring a value associated with a parameter of a task directly within the checklist protocol. A user who creates the condition is able to instruct the technician to go into the field. A user who creates the condition is also able to be the actual technician who goes into the field.

In some embodiments, the method 100 is at least partially implemented using a graphical user interface (GUI), e.g., a GUI 200 (FIG. 2), a GUI 300 (FIG. 3), a GUI 400 (FIG. 4), a GUI 500 (FIG. 5), or other suitable GUI. The checklist protocol is generated from a template, the template being stored in a database, and capable of being displayed in a GUI where a condition is able to be configured and applied to a task within the checklist protocol.

The method allows the user to configure the condition for the task, evaluating the output of the condition, and executing the condition on the task. In operation 102, the checklist protocol is able to be selected from a template on a home or landing page on the GUI (not shown). In some embodiments, the checklist protocol is imported from a separate system. In some embodiments, the checklist protocol is created in a system used to implement the method 100. In some embodiments, the checklist protocol is created using a GUI. In some embodiments, more than one checklist protocol is created. In some embodiments, the checklist protocol includes Tillable data fields for receiving data/information related to the parameter of the task used to create the checklist template. In some embodiments, the checklist protocol for a category of task includes pre-existing or default fields.

Figure 6:
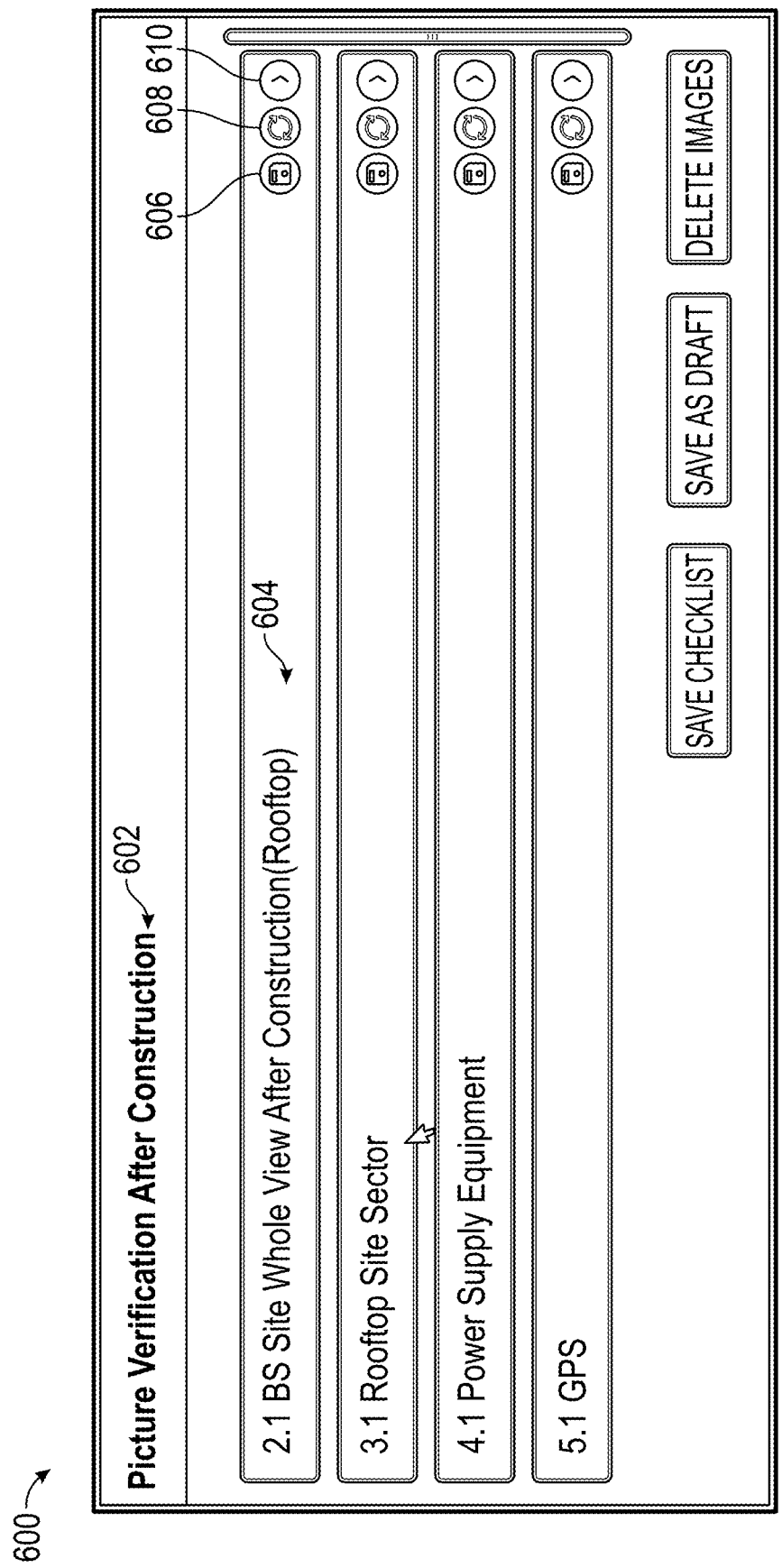
FIG. 6 is a view of a GUI of a checklist execution view in accordance with some embodiments.

In the checklist configuration view 102, in operation 104, the group designation is selected by a user using a user interface. In some embodiments, the group designation refers to the category of task within the checklist protocol to which the condition is applied based on the value selected by the user. In some embodiments, the group designation is "Battery Information", and the task being "Is battery installed?". In some embodiments, the group designation is "BS Site Whole View After Construction (Rooftop)", "Rooftop Site Sector", "Power Supply Equipment", "GPS", as shown in FIG. 6, and each group designation having a respective task. In some embodiments, a single group designation is associated with the checklist template. In some embodiments, a plurality of group designations is associated with the checklist template.

In operation 106, a user selects a group designation 104, and after the user selects the group designation 104 using a user interface, the task 106 associated with the group designation 104 is viewable. In some embodiments, the task is a pre-existing or default task within the checklist template. In some embodiments, the task is defined by the user. The task to be performed within a checklist protocol prompts the user to input a data/response on a GUI, and based on the data/response that the user inputted a result is output which directs the user to another GUI. For example, in FIG. 2, the task to be performed is task 204—"Is Battery Installed?". The user is prompted to select a parameters 206—"Yes/No" and the user inputs the data into the fillable data field 208.

In operation 108, the parameters are the categories of information for the task to be performed, and are selected by the user, for example, "Yes or No" for parameters 206. Next to the parameters are the fillable data fields where the user inputs a response, i.e., data, for example, the user inputting the "Yes" in the fillable data field 208. The data inputted by the user into the fillable data fields is mapped to a value.

In operation 110, the user is able to configure the condition in a condition menu, and the condition is able to be applied based on the data inputted into the fillable data fields, i.e., the data that is able to be inputted into the fillable data fields are mapped as values in the condition menu. For example, in FIG. 3, "Yes" is assigned as the value 306 to apply the condition. If the user inputs "Yes" into the fillable data field 208, the data is mapped to the value and the condition is applied. If the user inputs data into the fillable data field 208 that is not assigned as the value 306—the data is not being mapped to the value, then the condition is not applied, for example, if the user inputs "No" into the fillable data field 208. In some embodiments when the user inputs data that is not mapped to the assigned value configured in operation 110, then the condition is not applied to the task, and the default task is used. In some embodiments, when the user inputs data that is mapped to the assigned value configured in operation 110, then the condition is applied to the task, and the condition is implemented or applied to the task. When the condition is configured for the task, the user is able to edit the values of the parameters of the task. In some embodiments, new values are able to be entered by the user. In some embodiments, new values are able to be selected from a drop down menu, the new values being different than the default values. In some embodiments, the value is numeric. In some embodiments, the value is alphanumeric. In some embodiments, the value is a file able to be attached or imported from another system. In some embodiments, the value is a barcode, QR code, check box, date, image, video, or other.

In operation 112, the user is able to evaluate the condition to determine whether the condition is successfully implemented or applied to the task. The user is able to evaluate the condition by inputting the data into the fillable data field for the parameter, the data inputted by the user being mapped to the value when the condition was configured earlier in the method, and determine the output. In operation 114, when the data that is mapped to the value for the task is input, then the condition is applied to the checklist, and the user is able to use the checklist with the new condition.

In operation 116, when the data that is not mapped to the value for the task is input, then the condition is not applied to the checklist, and the user is able to use the default or standard checklist originally selected. In some embodiments, the user is able to evaluate the condition on a portable or hand held device.

In operation 118, the user is able to apply the new condition to the checklist in the checklist execution view. In some embodiments, the new condition is able to be applied in one instance for a task. In some embodiments, the new condition is able to be saved in the checklist template for a future task. In operation 120, the user is able to select the same group designation 120 as in the configuration view 102, the group designation 104. In operation 122, the user is able to view the same task as in the configuration view 102, the task 106. In operation 124, the user is able to view the same parameter as in the configuration view 102, the parameter 108, but the new condition is applied based on the value 110 the user configured for the task in the condition menu, discussed below, in the checklist configuration view 102.

Figure 2:
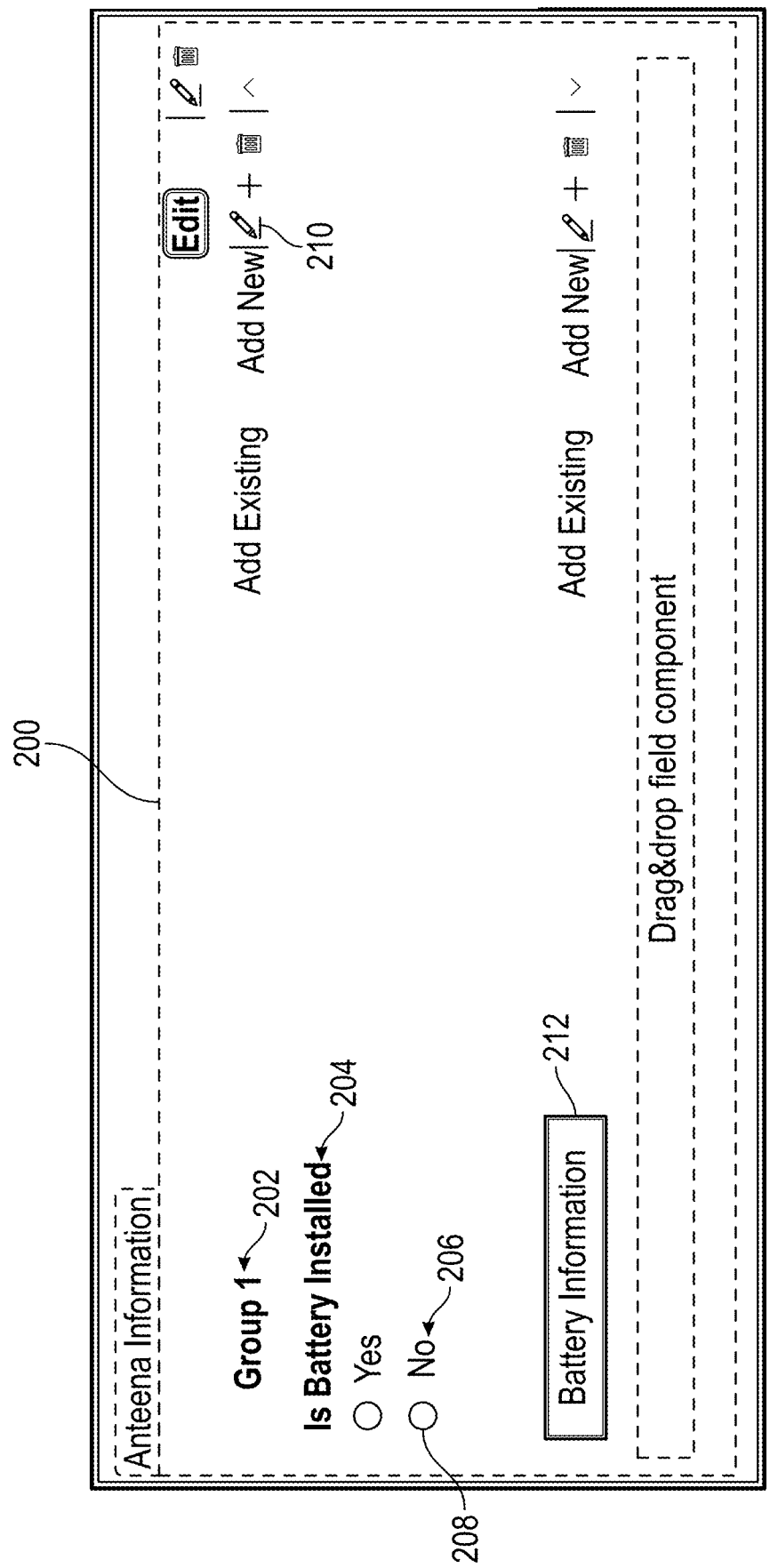
FIG. 2 is a view of a graphical user interface (GUI) of a checklist configuration view in accordance with some embodiments.

FIG. 2 is a GUI of a checklist configuration view 200 which is usable by a user to configure a condition for a task. In the checklist configuration view 200, a user is able to view a first group designation 202, a task 204 of the group designation 202, a parameter(s) 206, data field(s) 208 for data of the respective parameter 206 to be input, and an Edit icon/symbol 210. In some embodiments, the first group designation 202 and the task 204 of the first group designation 202 and a second group designation 212, are viewable. When the user selects the Edit icon/symbol 210, a Configuration Menu GUI appears (not shown). In some embodiments, the first group designation 202 and the task 204 of the first group designation 202 and the second group designation 212 are viewable. When the data inputted by the user into the Tillable data field(s) 208 of the parameter(s) 206 to the task 204, further discussed below, is correct (mapped to the value, discussed below) for the condition to be applied, such that when the data is inputted into the fillable data field for the parameter by the user, the condition is applied, and when the incorrect data (not mapped to the value, discussed below) is entered into the fillable data field for the parameter, the condition is not applied.

Figure 3:
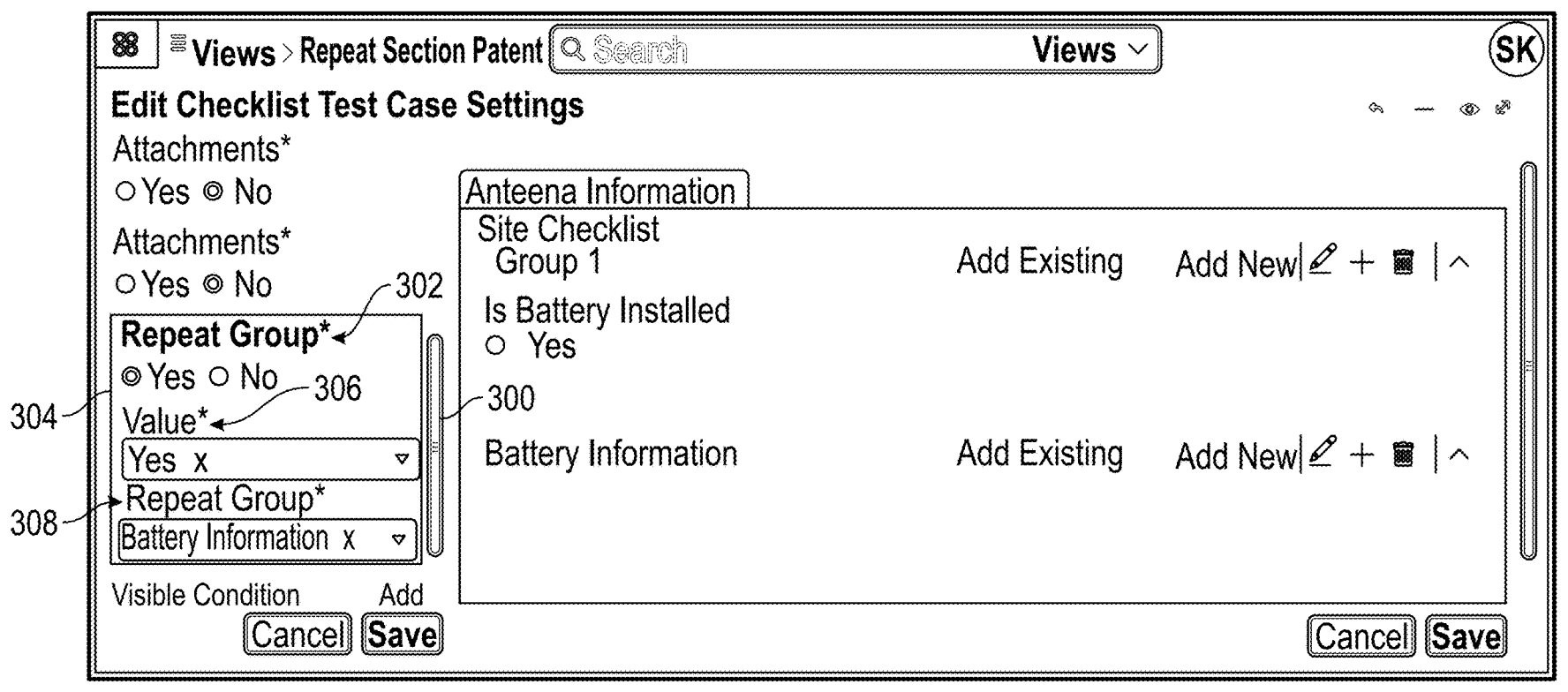

FIG. 3 is a GUI of a configuration menu 300 where a condition is able to be configured by a user for a task. In some embodiments, the configuration menu GUI 300 appears off to the side of the checklist configuration view GUI 200. In some embodiments, the configuration menu GUI 300 appears over the checklist configuration view GUI 200. The condition 302 is viewable in the configuration menu GUI 300. In some embodiments, the condition 302 is repetition of the group designation 202. Whether the condition is applied to the task is based on whether the condition is activated. In some embodiments, the condition is able to be activated 304 when the user affirmatively selects the condition, as seen here when "Yes" is selected. In some embodiments, the condition is not able to be activated when "No" is selected. A value 306 defines the data inputted into the fillable data field 208 of the checklist configuration view 200 or fillable data field 806 of a checklist execution view 800, discussed below. When the value 306 selected in the configuration menu 300 is the same as the data entered into the fillable data field 208 of the checklist configuration view 200 or 806 of the checklist execution view 800, the value and data are mapped, then the condition 302 is triggered and applied to the task. In some embodiments, when the condition 302 is selected to be activated 304, a sub-condition menu GUI 306/308 for the selected condition 302 is able to be viewed having a drop down menu to select the value 306 and the designated group 308 that the condition is applied to. In some embodiments, when the condition is not selected to be activated 304, then the sub-condition menu GUI 306/308 is not able to be viewed, such as in FIG. 4.

In the sub-condition menu 306/308, the user is able to select whether the condition 302 is to be activated. In some embodiments, the condition 302 to be activated is a repetition of a group designation and the group designation's respective task(s), parameters, or fillable data fields.

In the sub-condition menu 306/308, the user is able to select when the condition 302, that is activated 304, is to be applied. In some embodiments, when the condition 302 to be applied is based on the value 306 selected to trigger the condition 302 in the checklist execution view, when the data mapped to the value is inputted into the fillable data field of the parameter.

In the sub-condition menu 306/308, the user is able to select where the condition 302 is to be applied. In some embodiments, the user is able to apply the condition 302 to the group designation 202 for which the condition 302 is being configured for. In some embodiments, the user is able to apply the condition to the same group designation 202 for which the condition 302 is being configured for. In some embodiments, the user is able to apply the condition 302 to another or different group designation 212. In some embodiments, the user is able to apply the condition to a single group designation. In some embodiments, a user is able to apply the condition to a plurality of group designations.

Figure 4:
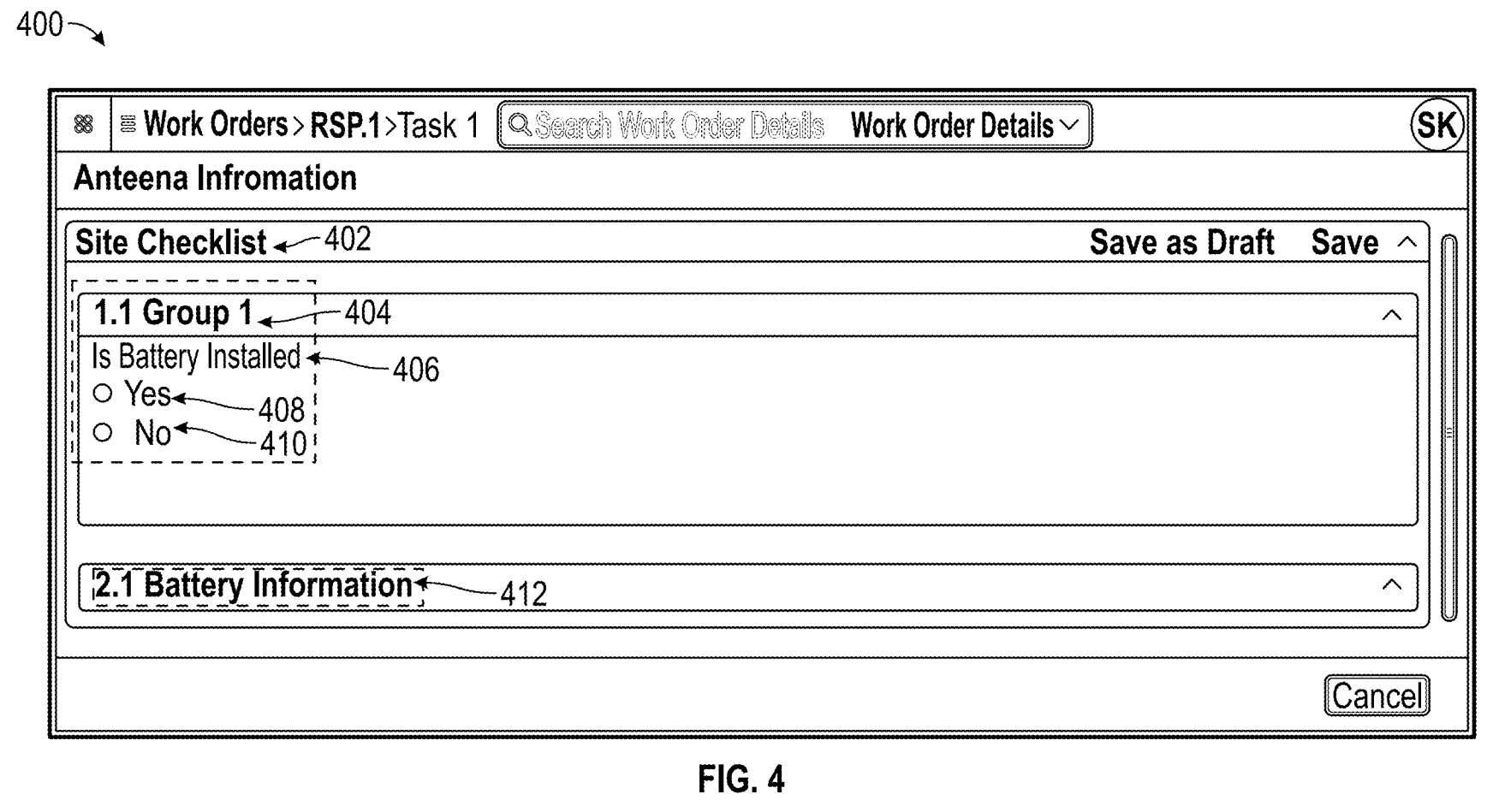

In FIG. 4 is another GUI of a checklist configuration view 400, where a user is able to test or evaluate the functionality of a task with the configured condition. The user is able to view the checklist 402, the group designation 404, the task 406, the parameter(s) 408, the data field(s) 410, and another different group designation 412. In some embodiments, in the configuration menu 300, when the condition 302 is activated 304, the value 306 is selected, and a group designation to which the condition is applied to is selected, the condition 302 will not be applied. In some embodiments, the condition will not be applied in the checklist execution view 600 because data entered into the fillable data field(s) 410 by the user is not mapped to the value 306 that was configured for the condition 302 in the configuration menu 300. In some embodiments, when the fillable data field(s) 410 is left blank and the value 306 is one other than blank, for example, the value in FIG. 300 is "Yes", then the condition 302 is not applied to the task 406 and the group designation selected to be repeated 308 is not repeated, as shown in FIG. 4 where the group designation 412 is not repeated. In some embodiments, when the fillable data field(s) 410 is "No" and the value 306 is one other than "No", for example, the value 304 selected in FIG. 300 is "Yes", then the condition 302 is also not applied to the task 406 and the group designation selected to be repeated 308 is not repeated, as seen here where group designation 412 is not repeated.

In FIG. 5 is another GUI of a checklist configuration view 500, where a user is able to test or evaluate a task with the configured condition in a different scenario. A user is able to view a checklist 502, a group designation 504, a task 506, a parameter(s) 508, fillable data fields 510, and another different group designation 512. In some embodiments, in the configuration menu 300, when the condition 302 is activated 304, the value 306 is selected, and a group designation 308 to which the condition is applied to is selected, the condition will be applied. In some embodiments, the condition will be applied in a checklist execution view 600 because data inputted into the fillable data field 510 by the user is mapped to the value 306 that was configured for the condition 302 in the configuration menu 300. In some embodiments, when data entered in the fillable data field 510 is "Yes" and the value 306 is "Yes", for example, the value in FIG. 300 is "Yes", then the condition 302 is applied to the task 506 and the group designation 308 selected to be repeated is actually repeated, as seen in FIG. 5 where the group designation 512 is repeated as group designation 514.

In FIG. 6 is a GUI of a checklist execution view 600 according to some embodiments. A user is able to view a checklist name 602, a number and name of a group designation 604, a first icon 606, a second icon 608, and a third icon 610. In some embodiments, a plurality of group designations are viewable, as seen in FIG. 6. The first icon 606 allows the user to save the checklist. In some embodiments, the checklist is able to be saved as a final checklist. In some embodiments, the checklist is able to be saved as a draft and accessible at a later time. The second icon 608 is adjacent to the first icon 606, and allows the user to refresh the group designation 604. The third icon 610 is adjacent to the second icon 608, and allows the user to view, when selected, the sub-features of the group designation 604 which are otherwise hidden.

Figure 7:
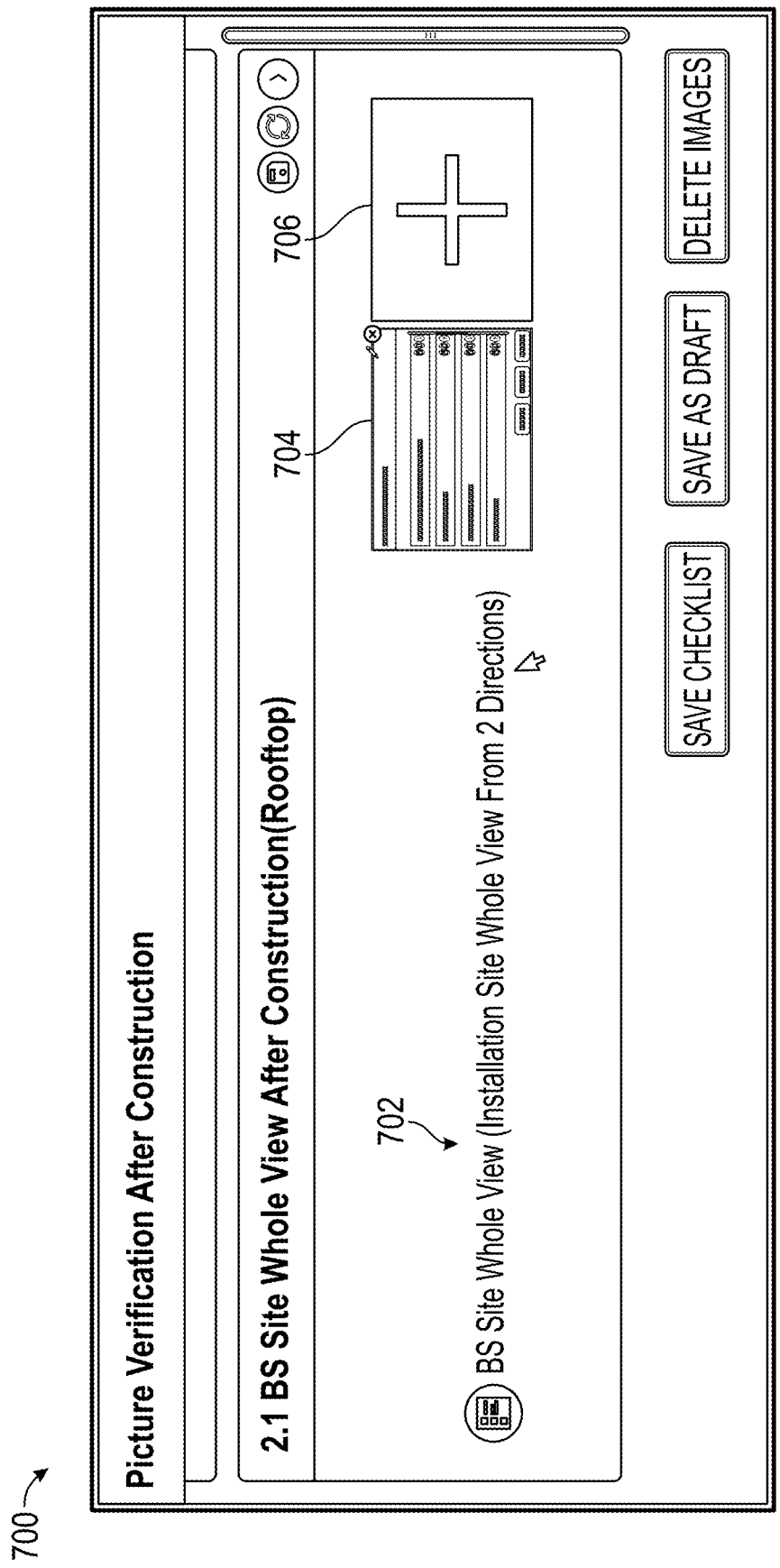
FIG. 7 is a view of a GUI of a checklist execution view in accordance with some embodiments.

In FIG. 7, is another GUI of a checklist execution view 700 according to some embodiments. In this view, when the third icon 610 is selected in the checklist execution view 600 then a user is able to view the sub-features of the group designation 604, which were otherwise hidden before the third icon 610 was selected. The user is able to view a task 702. The data entered into the fillable data field 704 by the user is also viewable. In some embodiments, the data is an image file as seen in FIG. 7. The fillable data field 706 before the data is inputted by the user, is also viewable. In some embodiments, the user is able to input the data by typing the data into the fillable data field. In some embodiments, the user is able to select the data from a drop down menu of preexisting or default values. In some embodiments, the user is able to drag and drop the data as a file into the fillable data field 706 as a means to input the data.

Figure 8:
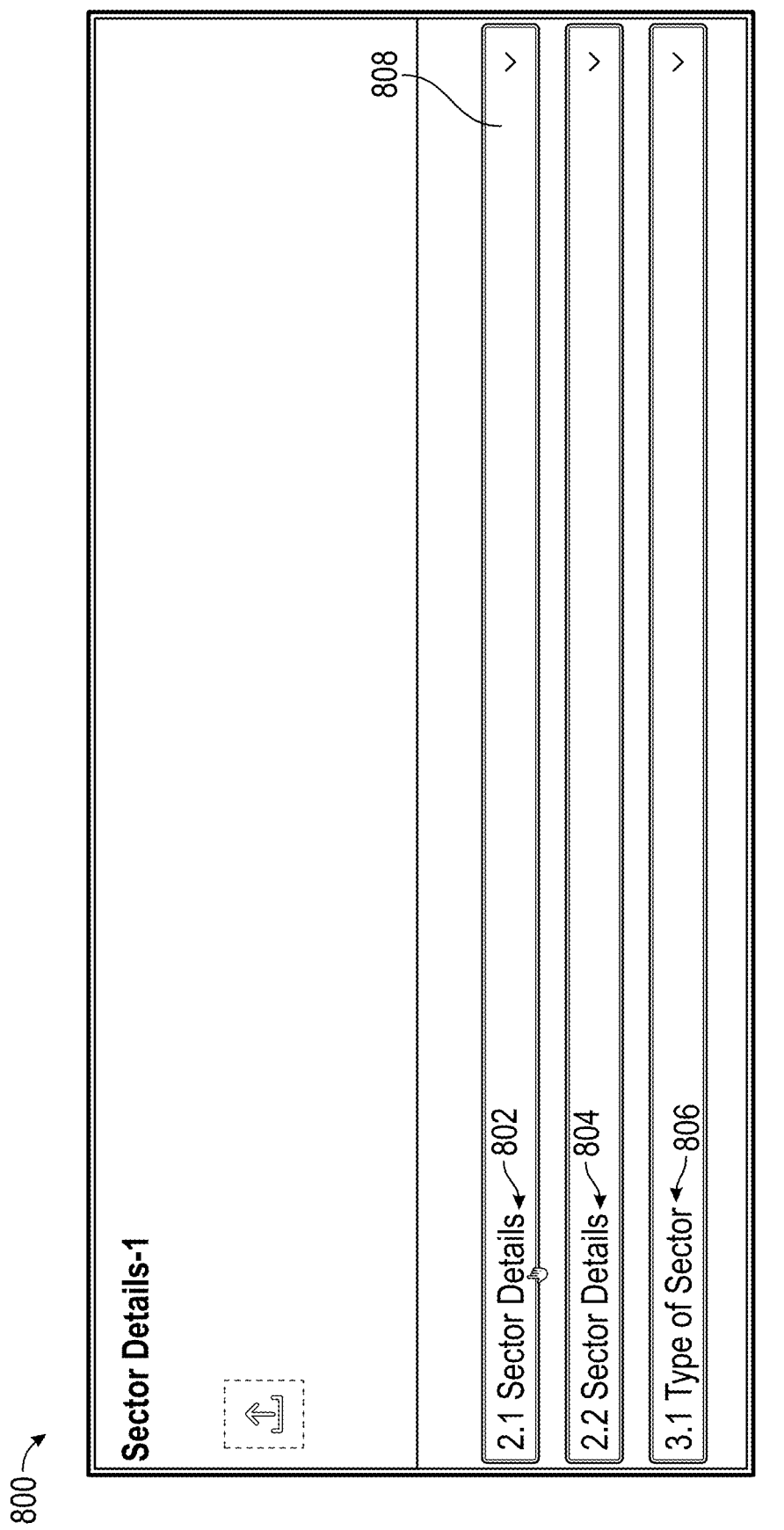
FIG. 8 is a view of a GUI of a checklist execution view in accordance with some embodiments.

In FIG. 8, is another GUI of a checklist execution view 800 according to some embodiments. In this view, a user is able to view an output of the condition 302 configured in the configuration menu 300 of the checklist configuration view 200. In the checklist execution view 800, the user is able to view group designation 802, and based on the data inputted into the fillable data field 706 of the task 702, the condition 302 was applied to group designation 802, which is repeated as group designation 804 as seen in FIG. 8, i.e., a repetition of group designation 802. In this view, the user is able to view the group designations—group designation 802, the repeat group designation 804, and a different group designation 806. A user, however, is not able to see the task 702 or fillable data field 706 unless a drill down icon 808 is selected.

Figure 9:
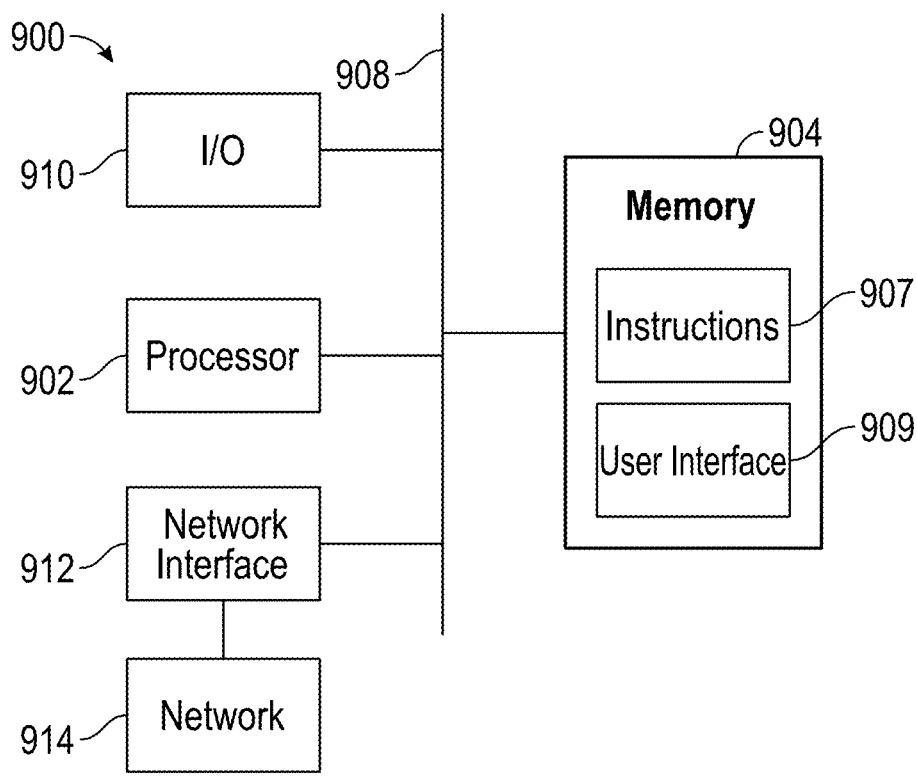
FIG. 9 is a functional block diagram of a computer or processor-based system upon which or by which some embodiments are implemented.

FIG. 9 is a functional block diagram of a computer or processor-based system 900 upon which or by which an embodiment is implemented. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with processors. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in method 100 or described with respect to FIGS. 1-8.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD). In some embodiments, the computer readable storage medium 904 is part of a cloud storage system.

In some embodiments, the storage medium 904 stores the computer program code 906 configured to cause system 900 to perform method 100 or the processes described with respect to FIGS. 1-8. In some embodiments, the storage medium 904 also stores information needed for performing a method 100 or the processes described with respect to FIGS. 1-8 as well as information generated during performing the method 100 or the processes described with respect to FIGS. 1-8.

In some embodiments, the storage medium 904 stores instructions 907 for interfacing with external devices. The instructions 907 enable processor 902 to generate images for display to the users of the system 900.

System 900 includes I/O interface 910. I/O interface 910 is coupled to external circuitry. In some embodiments, I/O interface 910 includes a keyboard, keypad, mouse, trackball, trackpad, touch-screen and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLU- ETOOTH, WIFI, WIMAX, GPRS, or WCDMA; or wired network interface such as ETHERNET, USB, or IEEE-1394. In some embodiments, method 100 or the processes described with respect to FIGS. 1-8 is implemented in two or more systems 900, and information is exchanged between different systems 900 via network 914.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for creating a checklist, comprising:
a processor; and
a memory having non-transitory instructions stored thereon that, in response to being executed by the processor, cause the apparatus to:
cause a graphic user interface ("GUI") to be output by a display, the GUI comprising:
a checklist configuration view to display a condition menu, the condition menu comprising a group of variables from which a user is able to select to configure a condition to be applied to a workflow, wherein the group of variables are interdependent comprising: (i) a type of condition, (ii) whether the type of condition is selected to be on/off, (iii) a value for the type of condition selected, and (iv) a location/object to which the type of condition selected will be applied to/acted upon, and the value is mapped to a data input; and
a checklist execution view to display the workflow, the workflow comprising a group designation having a task, a parameter, and a data field to receive the data input, wherein the condition is applied to the workflow in response to the data input, which is mapped to the value, being entered into the data field,
wherein, in the checklist configuration view, the condition is configured to occur in response to the data field receiving an affirmative selection of a repetition of the group designation from the condition menu,
wherein, in the checklist configuration view, the repetition of the group designation is configured in the condition menu as a value on which an affirmative selection in the data field of the parameter is based.

2. The apparatus of claim 1, wherein the checklist configuration view further comprises a checklist evaluation model where a user is able to evaluate the condition configured in the configuration menu before the condition is applied in the checklist execution view.

3. The apparatus of claim 1, wherein the data input comprises a barcode, a QR Code, a checkbox, a date, a file, an image, or a video.

4. The apparatus of claim 1, wherein the task comprises a plurality of tasks, and a relationship between at least one task of the plurality of tasks and another task of the plurality of tasks is dynamic.

5. The apparatus of claim 1, wherein the group designation comprises a plurality of group designations, and a relationship between a first group designation of the plurality of group designations and a second group designation of the plurality of group designations is determinable, and the relationship is the condition being configured for the first group designation and the condition being applied to the second group designation.

6. The apparatus of claim 5, wherein, in the checklist configuration view, the repetition of the group designation is configured in the condition menu as a value on which a non-affirmative selection in the data field of the parameter is based.

7. The apparatus of claim 1, wherein, in the checklist configuration view, the condition is configured to not occur based on a non-affirmative selection of a repetition of the group designation from the condition menu.

8. The apparatus of claim 6, wherein, in the checklist configuration view, a non-occurrence of the repetition of the group designation is configured in the condition menu as a value on which a non-affirmative selection in the data field of the parameter is based.

9. The apparatus of claim 6, wherein, in the checklist configuration view, a non-occurrence of the repetition of the group designation is configured in the condition menu as a value on which a blank selection of the parameter is based.

10. The apparatus of claim 1, wherein, in the checklist execution view, the repetition of the group designation occurs in response to the affirmative selection in the data field of the parameter.

11. The apparatus of claim 1, wherein, in the checklist execution view, the repetition of the group designation occurs in response to the non-affirmative selection in the data field of the parameter.

12. The apparatus of claim 7, wherein, in the checklist execution view, the non-occurrence of the repetition of the group designation is in response to the non-affirmative selection in the data field of the parameter.

13. The apparatus of claim 8, wherein, in the checklist execution view, the non-occurrence of the repetition of the group designation is in response to the blank selection of the parameter.

14. The apparatus of claim 5, wherein the value is a numerical value.

15. The apparatus of claim 1, wherein the group designation comprises a plurality of group designations, the plurality of group designations comprising a plurality of same group designations, and a relationship between the plurality of same group designations is determinable, and the relationship is at least the condition of repetition.

16. The apparatus of claim 1, wherein the group designation comprises a plurality of group designations, the plurality of group designations comprising a plurality of different group designations, a relationship between the plurality of different group designations is determinable, and the relationship is at least the condition of repetition.

17. A method, comprising:
storing instructions on a memory; and
executing, using a processor executing the instructions, to cause a graphic user interface ("GUI") to display an output comprising:
a checklist creation view for selecting a parameter, wherein the parameter is linked to a task,
the task linked to a group designation,
the checklist creation view further comprising an edit feature adjacent to the parameter,
selecting the edit feature to obtain a configuration menu to configure a condition,
assigning the condition to the parameter; and a checklist execution view of the group designation, the task, a data field, and the parameter, wherein, based on the selected parameter,
   applying the condition to the group designation or not applying the condition to the group designation, and
   the condition is repeating of the group designation or not repeating of the group designation,
a checklist configuration view to display a condition menu,
   wherein, in the checklist configuration view, the condition is configured to occur in response to the data field receiving an affirmative selection of a repetition of the group designation from the condition menu,
   wherein, in the checklist configuration view, the repetition of the group designation is configured in the condition menu as a value on which an affirmative selection in the data field of the parameter is based.

18. A non-transitory computer readable medium storing instructions thereon, wherein the instructions are executable by a processor to cause the processor to: cause a graphic user interface ("GUI") to be output by a display, the GUI comprising:

a checklist creation view to select a parameter, wherein
   the parameter is linked to a task,
   the task linked to a group designation,
   the checklist creation view further comprising an edit feature adjacent to the parameter,
   the edit feature, when selected, comprising a configuration menu to configure a condition,
   the condition being assignable to the parameter; and
a checklist execution view of the group designation,
   the task, a data field, and the parameter, wherein, based on the selected parameter,
   the condition is applied to the group designation or the condition is not applied to the group designation, and
   the condition is repetition of the group designation or no repetition of the group designation,
a checklist configuration view to display a condition menu,
   wherein, in the checklist configuration view, the condition is configured to occur in response to the data field receiving an affirmative selection of a repetition of the group designation from the condition menu,
   wherein, in the checklist configuration view, the repetition of the group designation is configured in the condition menu as a value on which an affirmative selection in the data field of the parameter is based.

* * * * *